Oct. 15, 1935.  H. E. RIGGS ET AL  2,017,806
DEVICE FOR MANIPULATING TUBE STOCK
Filed March 9, 1935  3 Sheets-Sheet 1
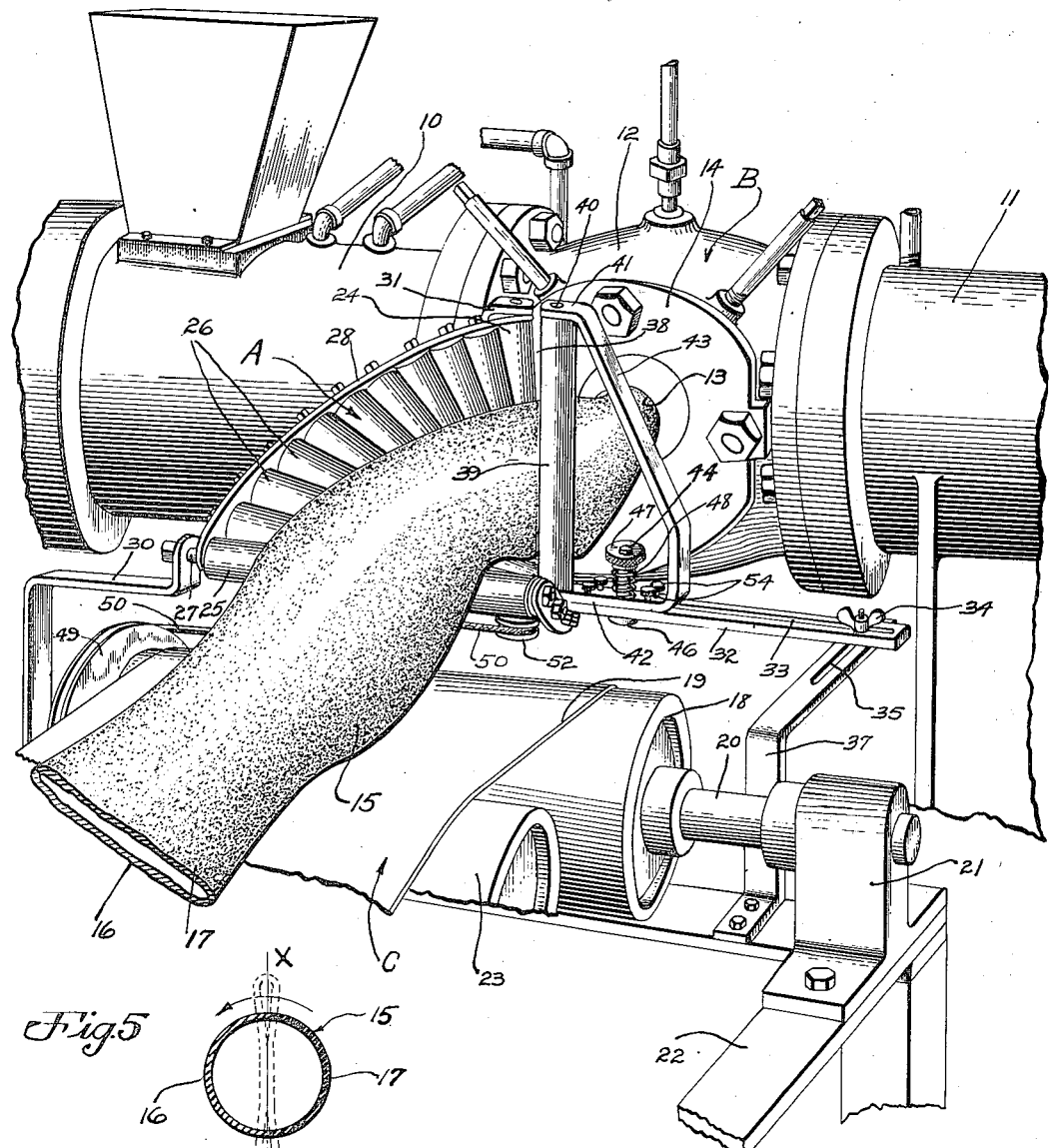
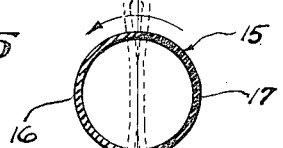
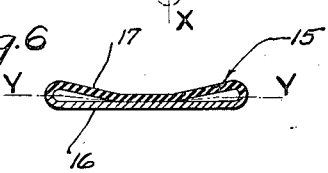
Inventors
Herbert E. Riggs
and Everett D. George
Attorney

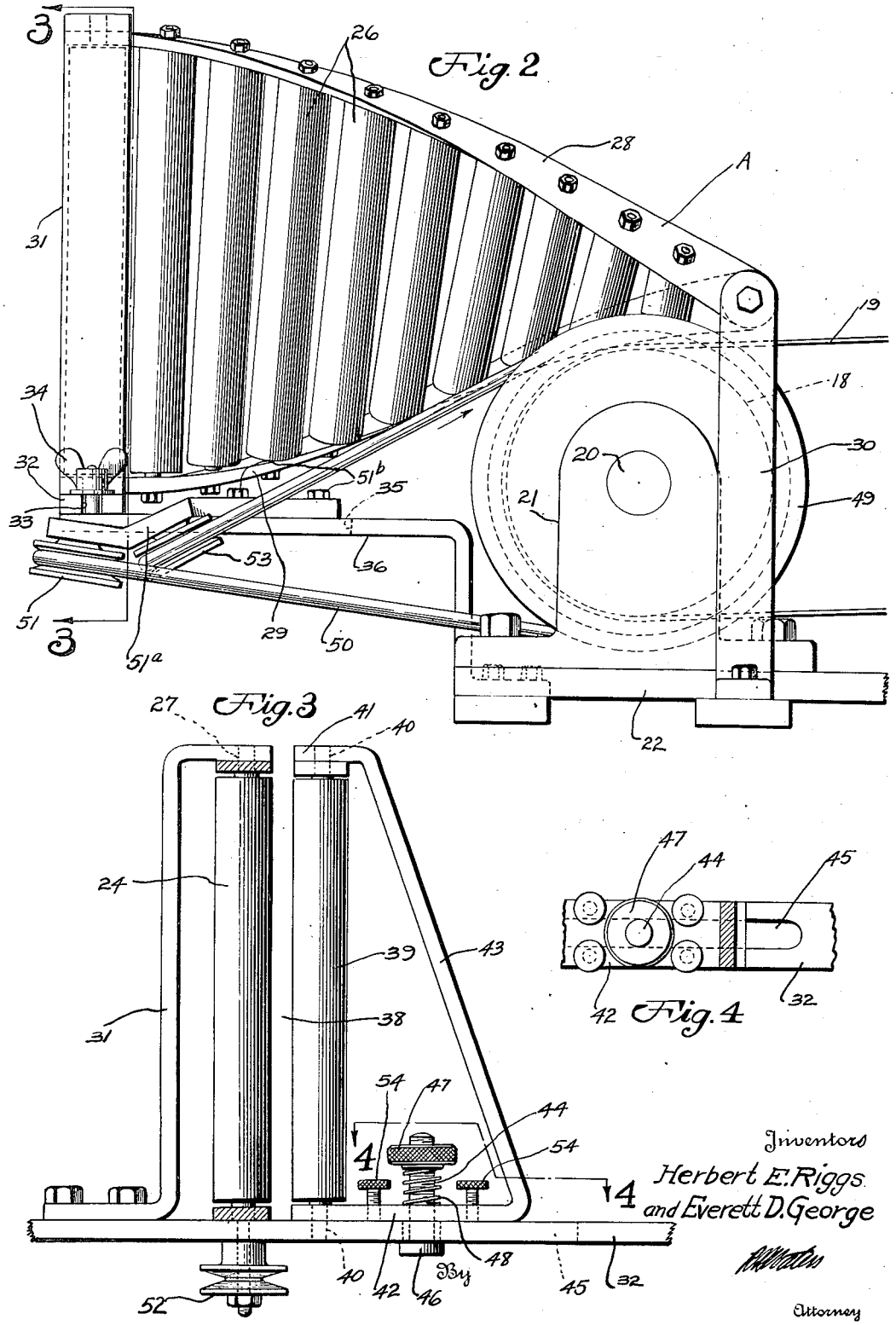

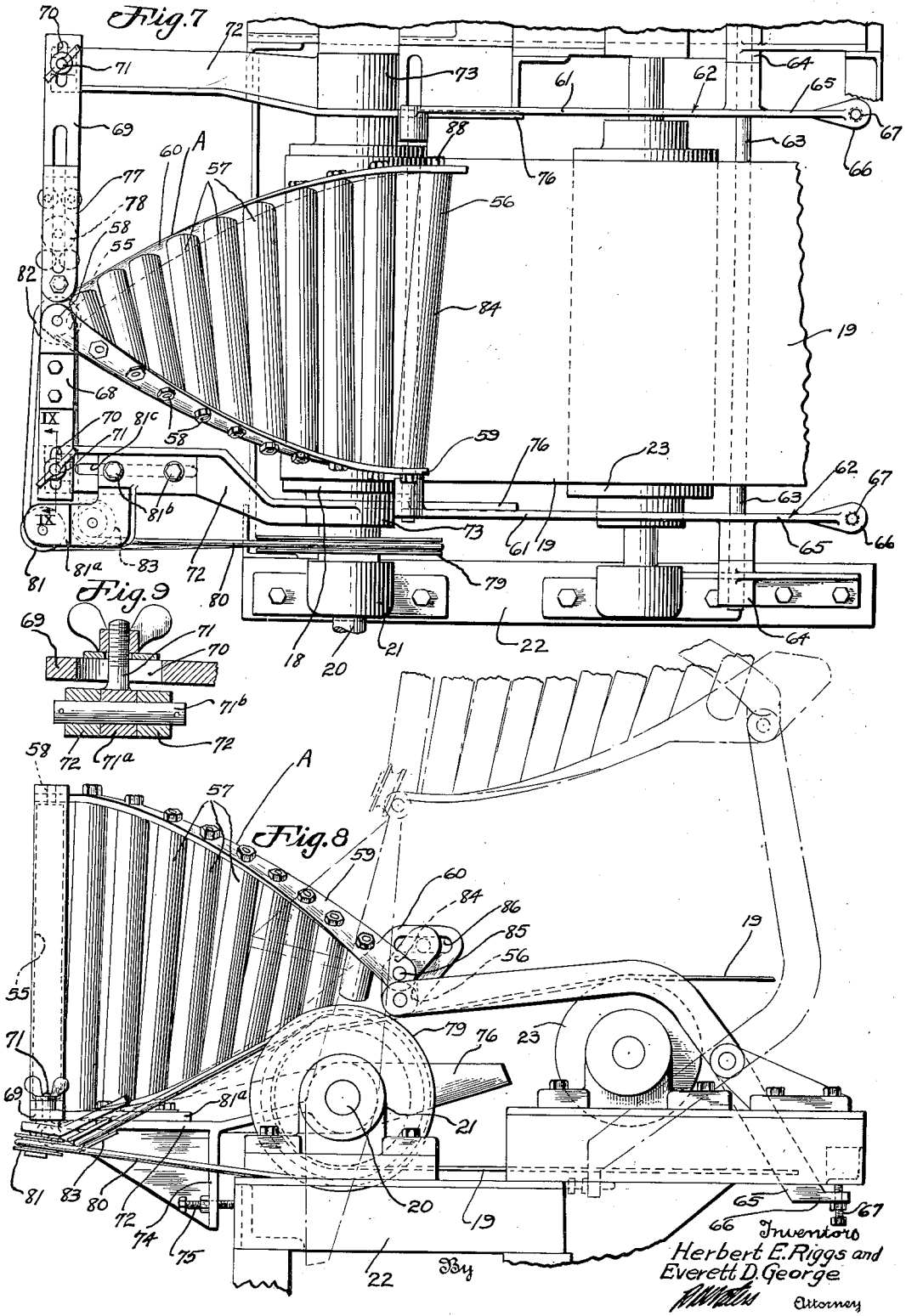

Patented Oct. 15, 1935

2,017,806

UNITED STATES PATENT OFFICE 2,017,806

DEVICE FOR MANIPULATING TUBE STOCK

Herbert E. Riggs, Akron, and Everett D. George, Cuyahoga Falls, Ohio, assignors to Wingfoot Corporation, Wilmington, Del., a corporation of Delaware Application March 9, 1935, Serial No. 10,282

20 Claims. (Cl. 18—13)

The present invention relates to the manufacture of rubber tube stock such as that employed in fabricating inner tubes for pneumatic vehicle tires and has particular relation to the manufacture of such tubes known as "Tu-Tone" distributed by The Goodyear Tire & Rubber Company.

In the manufacture of this particular type of tubing, rubber stock of different compositions, characteristics and/or colors, are supplied to an extruding machine which unites the different stocks and forces the same outwardly through an orifice or die head in the form of a continuous tube having wall areas of different stocks. Such a machine is disclosed in U. S. patent to W. C. State et al. No. 1,934,647, dated November 7, 1933. In this machine the different rubber stocks are fed into an extruding chamber from opposite sides thereof, from which chamber the rubber is forced through an extruding orifice or die head, where it becomes united to form tubing having the lines of union between the different rubber stocks disposed in a substantially vertical plane. In other words, by reason of the fact that the stock is supplied from opposite sides of the die head the tubing emerges therefrom on its side or 90° displaced from its normal position. If the tubing is deposited upon the conveyor and allowed to collapse in this position it will be apparent that portions of both the base and tread walls will lie next to the conveyor with similar portions of these walls disposed uppermost. This displacement of the tube will not only cause it to become initially folded or creased incorrectly but it will very seriously interfere with the subsequent cutting, marking and valve-applying operations. This also applies where the tube is fabricated with a base wall of a certain composition, such as rubber having relatively high dirt and rust resisting properties and a tread wall of another composition, such as rubber having high heat resisting properties. In either case the lines of demarcation between the two different stocks will be disposed in a vertical plane when the tubing is delivered to the conveyor and hence will result in the difficulties above mentioned.

One of the objects of the present invention is to avoid the disadvantages hereinabove set forth, by providing a simple and efficient device for supporting the tubing as it emerges from the extruding machine, turning the same about its longitudinal axis through an arc of substantially 90° and guiding it onto the conveyor in a flat or collapsed condition with the base wall of the tubing uppermost so as to facilitate subsequent valve applying operations.

Another object of the invention is to provide a device of the character described which embodies a plurality of rollers arranged at progressively varying angles to the vertical and which are adapted to receive and support the continuously extruded tubing in a vertically flattened condition, gradually to turn the tubing through an arc of 90° and to deposit the same flat upon the conveyor in the desired position.

Still another object of the invention is to provide a device of the type indicated which embodies a plurality of flattening rolls, one or more of which may be driven directly by the conveyor and in synchronism with the movement thereof.

A further object of the invention is to provide a tube handling device in which one or both of the flattening rolls may be tilted with respect to the vertical so as to impart an initial turning movement to the tubing in the desired direction, thus insuring that the flattened tubing will continue to turn after having thus been displaced from a dead-center position.

A still further object of the invention is to provide a tube handling device, such as that above referred to, which may quickly and easily be moved to and from its operative position with respect to the extruding machine.

With these and other objects in view as well as other advantages which may be incident to the use of the improvement, the invention consists in the parts and combinations thereof hereinafter set forth and claimed, with the understanding that the several necessary elements constituting the same may be varied in proportion and arrangement without departing from the nature and scope of the invention as defined in the appended claims.

In order to make the invention more clearly understood means are shown in the accompanying drawings for carrying the invention into practical effect, without limiting the improvements in their useful application to the particular constructions and arrangement which, for the purpose of explanation, have been made the subject of illustration.

In the accompanying drawings:

Fig. 1 is a perspective view of a tube-extruding machine and cooperating conveyor having a tube stock manipulating device or turning rack constructed in accordance with the present invention, arranged in operative position relative thereto;

Fig. 2 is a side elevation on a larger scale of the tube stock handling device illustrated in Fig. 1;

Fig. 3 is a vertical sectional view taken on line 3—3 of Fig. 2;

Fig. 4 is a fragmentary view partly in horizontal section and partly in plan view of a portion of the bracket for adjustably mounting one of the flattening rolls;

Fig. 5 is a diagrammatic sectional view illustrating the relative position of the tube stock as it emerges from the die head of the extruding machine, the flattened configuration and position thereof being indicated by broken lines;

Fig. 6 is a view of the flattened tube stock after having been turned and desposited upon the conveyor with the tread and base wall portions in the desired superimposed position;

Fig. 7 is a plan view of another form of tube supporting and guiding device embodying the invention;

Fig. 8 is a side elevation of the structure shown in Fig. 7; and

Fig. 9 is an enlarged fragmentary vertical sectional view taken on line 9—9 of Fig. 7.

Referring to the drawings, the improved tube turning and guiding rack A is shown as being associated with a rubber tube extruding machine, indicated generally at B, and a cooperating conveyor, indicated generally at C. The extruding machine B may be of any preferred type, such as that disclosed in the State patent previously referred to, and briefly comprises a pair of opposed coaxially aligned cylinders 10 and 11, each of which contains a screw (not shown) for forcing rubber stock of different colors or compounds into an intermediate extruding chamber 12 and thence outwardly therefrom through an extruding orifice 13 provided in a die head 14, in the form of an endless rubber tubing 15 having laterally opposed wall portions or areas 16 and 17 of different colors or compounds.

The conveyor B may also be of any suitable type and briefly comprises a drum 18 which carries an endless belt 19 and which is in turn carried by shaft 20 journaled in bearings 21 mounted upon a frame structure 22. The belt 19 is preferably additionally supported against undue sagging at the point where the tubing is delivered thereto by an auxiliary drum 23.

It will be apparent from the foregoing and from an inspection of Fig. 5 of the drawings, that by reason of the fact that the different rubber stocks enter the chamber 12 from opposite directions, they will emerge from the extruding orifice 13 in tube form and in side-by-side relation with the lines of union between the two stocks disposed in a substantially vertical plane, indicated by the broken line x—x in Fig. 5. Assuming that the wall portion 16 constitutes the tread wall portion of the tubing 15 and that the wall portion 17 constitutes the base wall portion thereof, it will be obvious that if the tubing 15 is deposited upon the conveyor belt 19 while in the position shown in Fig. 5, and is permitted to collapse or become flattened, both the tread and base walls 16 and 17 will become folded upon themselves with the line of demarcation therebetween still disposed in a vertical plane extending between the folds. In other words, the tubing 15 will be lying in a collapsed condition upon its side which will seriously interfere with, if not prevent, subsequent operations thereon.

In order to obviate this condition the improved tube turning and guiding device A is provided for the purpose of engaging the tubing 15 as it emerges from the extruding orifice 13 in the die head 14, for flattening the same, supporting and gradually turning the tubing through an arc of substantially 90° and for depositing the tubing upon the conveyor belt 19 with the base wall portion 17 thereof uppermost.

The device A preferably comprises an upper vertically disposed roller 24, a lower horizontally disposed roller 25 and a series of intermediate rollers 26, all mounted upon shafts 27, the opposite ends of which are journaled in upper and lower bearing frame members 28 and 29 respectively, of substantially helical curvature. The configuration and arrangement of the frame members 28 and 29 are such that the intermediate rollers 26 are disposed at progressively varying angles to the vertical and gradually approach the horizontal from the extruding orifice 13 toward the conveyor.

The forward lower end of the left-hand frame member 28, as viewed in Fig. 1, is carried by the adjacent end of the shaft 27 of the forward horizontal roller 25, which shaft is journaled in a bracket 30 mounted on the frame structure 22 of the conveyor C. The rear upper end of the frame member 28 is also carried by the adjacent end of the upper shaft 27 of the rear vertically disposed roller 24, which shaft is journaled in a bracket 31 fixedly mounted upon a horizontal, transversely extending bar 32. The upper forward end of the right hand frame member 29 is carried by the right hand end of the shaft 27 of the lower horizontal roller 25, but is otherwise unsupported. The rear end of this frame member, however, is supported by the bar 32 and is maintained against displacement by the lower end of the shaft 27 of the vertical roller 24. The ends of the bar 32 are slotted, as indicated at 33, for adjustable engagement by wing bolts 34 which pass through slots 35 provided in rearwardly extending bracket members 36 and 37 respectively, the forward ends of which are mounted on the frame structure 22 on opposite sides of the conveyor. By means of this construction the tube supporting and guiding rack A may be adjusted as an entirety toward and from the extruding orifice 13 and also laterally with respect to the center line thereof.

Cooperating with the rear vertical roller 24 and arranged in spaced relation thereto to provide a tube flattening pass 38 is a substantially vertically disposed flattening and guiding roller 39. This roller is mounted on a shaft 40 which is journaled at its ends in horizontally extending upper and lower portions 41 and 42 respectively, of a bracket 43 also carried by the bar 32. In order to adjust the size of the space or pass 38 between the vertical rollers 24 and 39, the bracket 43 is preferably mounted for adjustment in a lateral direction. (Figs. 3 and 4.) This is accomplished by securing the bracket 43 to the bar 32 by means of a bolt 44 which passes through a slot 45 in the bar 32 and through an aperture provided in the lower portion 42 of the bracket. The bolt 44 is formed with a head 46 which bears against the lower surface of the bar 32 and is provided with a knurled finger nut 47 which may be screwed down so as to bear upon a coil spring 48 surrounding the bolt 44 between the nut 47 and the upper face of the bracket portion 42. This particular construction is sufficient to maintain the flattening roller 39 in its laterally adjusted position with respect to the vertical roller 24, but will permit it to be tilted or canted forwardly to a slight extent against the action of the spring 48, for a purpose hereinafter to be described.

In order to relieve the relatively plastic tubing from undue longitudinal strain or tension such as might tend to stretch the rubber and which would result if it is permitted to be drawn between the rollers 24 and 39 by the action of the conveyor belt 19, one or both of these vertical rollers are rotated positively and in synchronism with the movement of the conveyor belt 19. To this end, a grooved pulley 49 is fixed to the shaft 20 adjacent one end of the drum 18 for driving engagement with a belt 50. As viewed in Fig. 2, the belt 50, after leaving the bottom of the pulley 49, passes rearwardly and around a sheave 51, carried by a bracket 51ª. This bracket is mounted for sliding adjustment on the bracket 36 by means of clamping bolts 51ᵇ engageable with the slot 35 provided in the bracket 36. From the sheave 51 the belt 50 passes laterally and forwardly around a pulley 52 fixed to the lower end of the shaft 27 of the vertical roller 24 (Fig. 3), thence laterally back upon itself and forwardly around a sheave 53 carried by the bracket 51ª and thence forwardly over the drive pulley 49. This arrangement of the parts materially simplifies the tube flattening or folding operation and relieves the tubing from the tensile strain above referred to. It will be noted that, with the above-described construction, only the vertical roller 24 is positively driven, the flattening roller 39 rotating idle, but if desired both of these rollers may be driven positively by suitably gearing them together.

In order to insure that the flattened tubing will turn toward and be supported and guided by the rollers 26 it is desirable to tilt or incline the roller 39 forwardly a slight degree. This is accomplished by providing a plurality of set screws 54 in the lower portion 42 of the bracket 43 for abutting engagement with the upper surface of the bar 32. By properly manipulating these set screws the entire bracket 43 and roller 39 journaled thereon may be tilted or inclined forwardly or rearwardly against the action of the coil spring 48.

From the foregoing it will be apparent that by rotating one or both of the vertical rollers 24 and 39, the flattened tubing 15 will emerge from between these rollers free from any tension to which it might otherwise be subjected by the motion of the conveyor belt 18, which tension might cause the rubber stock to become stretched. This freedom from strain also permits the flattened tubing 15 to gravitate over toward the rollers 26 under the initial biasing influence of the roller 39 and to lie flat thereon in a relaxed condition and in a position to be deposited upon the conveyor belt 19 with its base wall portion 16 uppermost. The tubing 15 is thus turned in a counter-clockwise direction, as indicated by the arrow in Fig. 5, through an arc of 90° from a position in which the lines of union between the wall portions or areas 16 and 17 of different colors or compositions are disposed in the vertical plane x—x indicated in this figure, to a position in which these lines of union are disposed in the horizontal plane y—y, indicated in Fig. 6.

Under certain conditions it may be desirable to interrupt the production of "Tu-Tone" tube stock so as to employ the extruding machine in the fabrication of tubing from a single stock. In such event it is obviously impractical to dissemble or remove the turning and guiding rack A. This difficulty is obviated in the construction shown in Figures 7 and 8. In this particular construction the tube-turning and guiding rack A is shown as comprising an upper, vertically disposed roller 55, a lower horizontally disposed roller 56 and a series of intermediate rollers 57, all journaled upon shafts 58, the opposite ends of which are fixed in upper and lower bearing frame members 59 and 60 respectively, also of substantially helical curvature. As in the construction shown in Figures 1 to 3, the configuration and arrangement of the frame members 59 and 60 are such that the intermediate rollers 57 are disposed at progressively varying angles to the vertical, with the roller nearest to the extruding orifices disposed substantially vertically and with the others gradually approaching the horizontal toward the conveyor.

The forward ends of the upper and lower frame members 59 and 60 are pivotally connected to the rear ends of rearwardly extending arms 61 of a pair of levers 62 arranged one on each side of the conveyor. These levers extend forwardly and downwardly over the shaft of the supporting drum 23 and are in turn pivotally mounted intermediate their lengths upon the ends of a shaft 63 which extends transversely beneath the conveyor belt 19 and is journaled in bearing blocks 64 mounted upon the frame structure 22. The levers 62 are provided with downwardly extending arms 65 terminating in ears 66 through which adjusting screws 67 are threaded for abutting engagement with the underside of the frame structure 22, thus limiting the downward swinging movement of the arms 61 and parts carried thereby. The rear upper end of the frame member 59 is also carried by the upper end of the shaft 58 of the rear vertically disposed roller 55, which shaft is journaled in a bracket 68 mounted upon a horizontal transversely extending bar 69. The rear lower end of the frame member 60 is supported by the bar 69 and is maintained against displacement by the lower end of the shaft 58 of the vertical roller 55. The ends of the bar 69 are slotted, as at 70, for adjustable engagement by wing bolts 71 formed with eyes 71ª at their lower ends which are pivotally connected by means of pins 71ᵇ to the bifurcated ends of rearwardly extending arms 72. The forward ends of the arms 72 are formed with bearing hubs 73 for swinging engagement with the shaft 20 of the drum 18 on opposite sides of the conveyor.

The arms 72 are formed with downwardly extending shoulder portions 74 provided with adjusting screws 75 for abutting engagement with the rear of the frame structure 22 when the device occupies its operative position in order to limit the downward swinging movement thereof. The arms 72 are also formed with forward extensions 76 for engagement with the frame 22, as indicated by dotted lines in Fig. 8, when the device is swung upwardly to its inoperative position presently to be described.

Mounted in a bracket 77 for cooperation with the rear vertical roller 55 is a spaced parallel flattening roller 78. This roller and associated mechanism is identical in construction, operation, and in function to the roller 39 hereinbefore described in connection with Figs. 1 to 3, and therefore, a further description is believed to be unnecessary. Also the vertical roller 55 is rotated by means similar in all respects to that previously described in connection with the roller 24, but which briefly includes a driving pulley 79 fixed to the conveyor drum shaft 20, cooperating belt 80 which passes rearwardly around a sheave 81 carried by a bracket 81ª. This bracket is mounted for sliding adjustment on the adjacent arm 72 by means of clamping bolts 81ᵇ engageable with a slot 81ᶜ provided in the arm 72. From the sheave 81 the belt 80 passes laterally and forwardly around pulley 82 fixed to the shaft 58 of roller 55, thence back upon itself and forwardly around a sheave 83 carried by bracket 81ª and thence back to driving pulley 79.

In order further to control the movement of the tubing 15 as it is delivered to the conveyor and to insure that it has been turned properly, an auxiliary control roller 84 is provided at the point where the tubing leaves the turning rack A. This roller is carried by a shaft 85 which is loosely mounted at one end in the frame member 59 directly above the horizontal roller 56. The other end of this shaft, however, is mounted for a limited amount of horizontal sliding movement in a slot 86 formed in an upwardly extending ear or enlargement 87 provided on the opposed frame member 60 and at a point above and in advance of the first mentioned end of this shaft. By adjusting the shaft 85 in the slot 86 forwardly or rearwardly and locking the same in the desired adjusted position by means of a lock nut 88, the movement of the tubing 15 may be controlled with accuracy.

By means of the above described construction the turning rack and associated mechanism may quickly and easily be moved to and from its operative position with respect to the extruding orifice 13 with a minimum of time and effort.

While the invention has been shown and described in connection with the fabrication of "Tu-Tone" tubes, it will be understood that it is also applicable in the manufacture of relatively flat stock such as tire treads and the like which embody rubber of different colors or compositions and which emerges from the extruding orifice upon its edge.

Other modifications and changes in proportion and arrangement of the several necessary elements constituting the invention may be made by those skilled in the art without departing from the nature and scope of the invention as defined in the appended claims.

What we claim is:

1. In combination with a machine for extruding rubber tubing having opposite wall portions of different rubber stocks initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane.

2. In combination with a machine for extruding rubber tubing having opposite wall portions of different rubber stocks initially formed with the lines of union therebetween disposed in a substantially vertical plane and a conveyor cooperating with said machine, means for supporting said tubing as it emerges from said machine and for guiding the same onto said conveyor with one of said wall portions uppermost.

3. In combination with a machine for extruding rubber tubing having opposite wall portions of different rubber stock initially formed with the lines of union therebetween disposed in a substantially vertical plane and a conveyor cooperating with said machine, roll means for supporting said tubing as it emerges from said machine and for guiding the same onto said conveyor with said lines of union disposed in a substantially horizontal plane.

4. In combination with a machine for extruding rubber tubing having opposite wall portions of different rubber stock initially formed with the lines of union therebetween disposed in a substantially vertical plane and a conveyor cooperating with said machine, a plurality of rollers disposed at an angle to one another for engaging said tubing as it emerges from said machine and for guiding the same onto said conveyor with said lines of union disposed in a substantially horizontal plane.

5. In combination with a machine for extruding rubber tubing having opposite wall portions of different rubber stock initially formed with the lines of union therebetween disposed in a substantially vertical plane and a conveyor cooperating with said machine, a plurality of rollers engageable with opposite sides of said tubing as it emerges from said machine and for guiding the same onto said conveyor with said lines of union disposed in a substantially horizontal plane.

6. In combination with a machine for extruding rubber tubing having opposite wall portions of different rubber stock initially formed with the lines of union therebetween disposed in a substantially vertical plane and a conveyor cooperating with said machine, a plurality of rollers arranged at progressively varying angles to the vertical and to each other for supporting said tubing as it emerges from said machine and for guiding the same onto said conveyor with said lines of union disposed in a substantially horizontal plane.

7. In combination with a machine for extruding rubber tubing having opposite wall portions of different rubber stock initially formed with the lines of union therebetween disposed in a substantially vertical plane and a conveyor cooperating with said machine, a plurality of laterally spaced rollers mounted for rotation about substantially vertical axes for flattening said tube as it passes therebetween, and a plurality of other rollers disposed at progressively varying angles to the vertical for supporting said flattened tube and guiding the same onto said conveyor with said lines of union disposed in a substantially horizontal plane.

8. In combination with a machine for extruding rubber tubing having opposite wall portions of different rubber stock initially formed with the lines of union therebetween disposed in a substantially vertical plane and a conveyor cooperating with said machine, a plurality of laterally spaced rollers mounted for rotation about substantially vertical axes for flattening said tube as it passes therebetween, and a plurality of other rollers disposed at progressively varying angles to the vertical and to one another for supporting said flattened tube and guiding the same onto said conveyor with said lines of union disposed in a substantially horizontal plane.

9. In combination with a machine for extruding rubber tubing having opposite wall portions of different rubber stock initially formed with the lines of union therebetween disposed in a substantially vertical plane and a conveyor cooperating with said machine, a plurality of laterally spaced rollers mounted for rotation about substantially vertical axes for flattening said tube as it passes therebetween, a plurality of other rollers disposed at progressively varying angles to the vertical for supporting said flattened tube and guiding the same onto said conveyor with said lines of union disposed in a substantially horizontal plane, and means for tilting one of said flattening rollers to bias the flattened tubing toward said supporting rollers.

10. In combination with a machine for extruding rubber tubing having opposite wall portions of different rubber stock initially formed with the lines of union therebetween disposed in a substantially vertical plane and a conveyor cooperating with said machine, a plurality of laterally spaced rollers mounted for rotation about substantially vertical axes for flattening said tube as it passes therebetween, a plurality of other rollers disposed at progressively varying angles to the vertical for supporting said flattened tube and guiding the same onto said conveyor with said lines of union disposed in a substantially horizontal plane, and means for rotating one of said flattening rollers.

11. In combination with a machine for extruding rubber tubing having opposite wall portions of different rubber stock initially formed with the lines of union therebetween disposed in a sub-substantially vertical plane and a conveyor cooperating with said machine, a plurality of laterally spaced rollers mounted for rotation about substantially vertical axes for flattening said tube as it passes therebetween, a plurality of other rollers disposed at progressively varying angles to the vertical for supporting said flattened tube and guiding the same onto said conveyor with said lines of union disposed in a substantially horizontal plane, and means for rotating one of said flattening rollers in synchronism with the movement of said conveyor.

12. In combination with a machine for extruding rubber tubing having opposite wall portions of different rubber stock initially formed with the lines of union therebetween disposed in a substantially vertical plane and a conveyor cooperating with said machine, a plurality of laterally spaced rollers mounted for rotation about substantially vertical axes for flattening said tube as it passes therebetween, a plurality of other rollers disposed at progressively varying angles to the vertical for supporting said flattened tube and guiding the same onto said conveyor with said lines of union disposed in a substantially horizontal plane, and means driven by said conveyor for rotating one of said flattening rollers.

13. In combination with a machine for extruding rubber tubing having opposite wall portions of different rubber stock initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane, said supporting means being mounted for bodily movement into and out of operative relation to said extruding machine and said conveyor.

14. In combination with a machine for extruding rubber tubing having opposite wall portions of different rubber stock initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane, said supporting means being mounted for swinging movement to and from an operative position with respect to said extruding machine and said conveyor.

15. In combination with a machine for extruding rubber tubing having opposite wall portions of different rubber stock initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane, said supporting means being mounted for swinging movement to and from an operative position with respect to said extruding machine and said conveyor, and adjustable means for limiting the swinging movement of said supporting means in opposite directions.

16. In combination with a machine for extruding rubber tubing having opposite wall portions of different rubber stock initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane, said means including a roller arranged at an angle to the horizontal and to the direction of travel of said tubing and with which said tubing finally contacts in passing onto said conveyor.

17. In combination with a machine for extruding rubber tubing having opposite wall portions of different rubber stock initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane, said means including a roller arranged at an angle to the horizontal and with which said tubing finally contacts in passing onto said conveyor, said roller having one end thereof adjustable in the direction of movement of said tubing.

18. In combination with a machine for extruding rubber tubing having opposite wall portions of different rubber stock initially formed with the lines of union therebetween disposed in a substantially vertical plane and a conveyor cooperating with said machine, means for supporting said tubing as it emerges from said machine and for guiding the same onto said conveyor with said lines of union disposed in a substantially horizontal plane, said means including a roller engageable with said tubing on the side opposite from said supporting means, said roller having one end thereof mounted for adjustment in the direction of movement of said conveyor.

19. In combination with a machine for extruding rubber stock having portions of different compositions and delivered in a position offset angularly with respect to its normal position, and a cooperating conveyor, means for engaging said stock as it emerges from said machine, turning it about its longitudinal axis and delivering the same to said conveyor in desired position.

20. In combination with a machine for extruding rubber stock having portions of different compositions and delivered in a position offset angularly with respect to its normal position, and a cooperating conveyor, a plurality of rollers arranged at progressively varying angles to the vertical for engaging said stock as it emerges from said machine, turning it about its longitudinal axis and delivering the same to said conveyor in its normal position.

EVERETT D. GEORGE.
HERBERT E. RIGGS.